United States Patent
Vassily et al.

(10) Patent No.: US 7,104,272 B2
(45) Date of Patent: Sep. 12, 2006

(54) VEHICLE BATTERY FLUID SUPPLY SYSTEM WITH VACUUM SOURCE

(75) Inventors: Michael A. Vassily, North Augusta, SC (US); R. Linwood Woodard, Jr., Evans, GA (US)

(73) Assignee: Club Car, Inc., Augusta, GA (US)

( * ) Notice: Subject to any disclaimer, the term of this patent is extended or adjusted under 35 U.S.C. 154(b) by 493 days.

(21) Appl. No.: 10/283,828

(22) Filed: Oct. 30, 2002

(65) Prior Publication Data

US 2004/0086777 A1    May 6, 2004

(51) Int. Cl.
*H01M 2/36* (2006.01)

(52) U.S. Cl. .................. 137/1; 137/260; 137/171; 137/899; 137/565.01; 429/63; 429/74

(58) Field of Classification Search .............. 137/260, 137/171, 899, 565.01, 1; 429/63, 74, 72, 429/82
See application file for complete search history.

(56) References Cited

U.S. PATENT DOCUMENTS

| | | | |
|---|---|---|---|
| 2,771,101 A | | 11/1956 | Thompson |
| 3,434,887 A | * | 3/1969 | Seckinger ............... 429/63 |
| 3,855,005 A | * | 12/1974 | Huhta-Koivisto ........ 429/82 |
| 3,928,078 A | * | 12/1975 | Kothe et al. ............ 429/82 |
| 4,424,263 A | | 1/1984 | Howell et al. |
| 4,522,896 A | | 6/1985 | Iseard |
| 5,543,243 A | | 8/1996 | Brecht |
| 6,087,805 A | | 7/2000 | Langston et al. |
| 6,213,145 B1 | | 4/2001 | Crook et al. |
| 6,786,226 B1 | * | 9/2004 | Crook et al. ............. 137/260 |

FOREIGN PATENT DOCUMENTS

| | | |
|---|---|---|
| DE | 1671748 | 10/1971 |
| WO | WO 2004/024485 | 3/2004 |

* cited by examiner

Primary Examiner—Kevin Lee
(74) Attorney, Agent, or Firm—Michael Best & Friedrich LLP (57) ABSTRACT

A system for supplying fluid to a battery, a vacuum source, a vehicle, a combination, a method for supplying fluid to a battery and a method of charging a battery. The fluid supply system supplies fluid to a battery in a vehicle, the vehicle including a frame supporting the battery, the battery including a battery cell, fluid being transmittable to the battery cell. The system is defined as including a hydraulic circuit connecting the battery to a tank. The hydraulic circuit is defined as including an inlet conduit connectable to tank, an outlet conduit connectable to the battery cell, and a vacuum source connectable to the battery cell and to the tank. The vacuum source is defined as including a pump having a pump inlet conduit connectable to the tank, and a pump outlet, and a venturi having a first inlet connectable to the pump outlet, a second inlet connectable to the battery cell, and a venturi outlet is connectable to the tank. The pump is operable to cause flow through the venturi, flow through the venturi causing fluid flow from the tank and through the battery cell.

67 Claims, 4 Drawing Sheets

VEHICLE BATTERY FLUID SUPPLY SYSTEM WITH VACUUM SOURCE

FIELD OF THE INVENTION

The present invention relates to liquid electrolytic batteries and, more particularly, to a fluid supply system for adding water to the liquid electrolyte in the batteries.

BACKGROUND OF THE INVENTION

Battery-powered vehicles, such as, for example, golf carts and utility vehicles, require periodic charging of the batteries and replenishment of liquid electrolyte in the batteries.

SUMMARY OF THE INVENTION

One independent problem with existing filling devices and procedures is that a separate fluid hook-up step is required before the liquid electrolyte can be replenished in the batteries.

Another independent problem with existing filling systems and procedures is that, each time the batteries are replenished with fluid, a separate fluid source must be connected to the filling system, and fluid must be replenished, even if only a small amount of fluid must be replenished.

Yet another independent problem with existing filling systems and procedures is that a separate source of pressure is required to supply fluid to the filling system. Such a separate pressurized source may be a pump or a vacuum connected to the filling system.

A further independent problem with existing filling systems and procedures is that, if a vacuum source is used to cause fluid flow through the batteries, the vacuum source may draw battery gas from the batteries and may return the battery gas to the source of fluid or tank. The battery gas may then be vented when an operator accesses the tank.

An independent problem with a venturi is that, if the venturi is above the fluid level in a fluid system, the venturi will not produce the necessary suction to cause fluid flow in the system.

The present invention provides a system for supplying fluid to a battery, a vehicle and a method for supplying fluid to a battery which substantially alleviate one or more of the above-described and other problems with existing filling systems and procedures. More particularly, in some aspects, the present invention provides a fluid supply system in which fluid flow through a venturi supported on the vehicle frame creates a vacuum which causes fluid flow through the battery. In some aspects, the present invention provides a fluid supply system including a vacuum source to cause fluid flow through the battery and a gas separator to separate battery gas from the fluid flowing from the battery. In some aspects, the present invention provides a fluid supply system including a venturi for creating a vacuum to cause fluid flow through the battery and a muzzle for collecting fluid to submerge the venturi outlet.

In particular, the present invention provides a system for supplying fluid to a battery, the battery including a battery cell, fluid being transmittable to the battery cell. The system is defined as comprising a hydraulic circuit connecting the battery to a tank for holding fluid, the hydraulic circuit including an inlet conduit connectable to the tank, and an outlet conduit connectable to the battery cell, and a vacuum source connectable to the battery cell and to the tank. The vacuum source is defined as including a pump having a pump inlet connectable to the tank and a pump outlet, a venturi having a first inlet connectable to the pump outlet, a second inlet connectable to the battery cell, and a venturi outlet, and a muzzle connectable to the venturi outlet, fluid being collectable in the muzzle to submerge the venturi outlet, the pump being operable to cause flow through the venturi, flow through the venturi causing fluid flow from the tank, through the battery cell, and from the venturi outlet.

In some constructions, the system may further comprise a gas separator connectable to the battery cell, fluid and gas from the battery cell flowing into the gas separator, the gas being separated from the fluid in the gas separator. Preferably, the muzzle collects an amount of fluid sufficient to create a vacuum at the second inlet. The muzzle may include at least one opening allowing fluid flow from the venturi outlet. The venturi outlet has a cross-sectional outlet area, and the at least one opening has a cross-sectional opening area, the opening area preferably being greater than the outlet area. Preferably, the muzzle provides a seal at the connection to the venturi outlet. The muzzle is preferably connectable between the venturi outlet and the tank so that fluid flows from the venturi outlet to the tank.

Also, the present invention provides a system for supplying fluid to a battery in a vehicle, the vehicle including a frame supporting the battery, the battery including a battery cell, fluid being transmittable to the battery cell. The system is defined as comprising a hydraulic circuit connecting the battery to a tank for holding fluid, the hydraulic circuit including an inlet conduit connectable to the tank, and an outlet conduit connectable to the battery cell, and a vacuum source connectable between the battery cell and the tank. The vacuum source is defined as including a pump having a pump inlet connectable to the tank and a pump outlet, and a venturi supported on the vehicle, the venturi having a first inlet connectable to the pump outlet, a second inlet connectable to the battery cell, and a venturi outlet, the pump being operable to cause flow through the venturi, flow through the venturi causing fluid flow from the tank, through the battery cell, and from the venturi outlet.

In some constructions, the system may further comprise a gas separator connectable to the battery cell, fluid and gas from the battery cell flowing into the gas separator, the gas being separated from the fluid in the gas separator. Also, the vacuum source may include a muzzle connectable between the venturi outlet and the tank, fluid being collectable in the muzzle to submerge the venturi outlet.

In addition, the present invention provides a system for supplying fluid to a battery, the system comprising a hydraulic circuit connecting the battery to a tank for holding fluid, the hydraulic circuit including an inlet conduit connectable to the tank, an outlet conduit connectable to the battery cell, a vacuum source connectable to the battery cell and to the tank, the vacuum source being operable to cause fluid flow from the tank and through the battery cell, and a gas separator connectable to the battery cell, fluid and gas from the battery cell flowing into the gas separator, the gas being separated from the fluid in the gas separator.

Preferably, the gas separator includes a vent, the separated gas being vented through the vent. The battery cell has an air space having a size, and the gas separator preferably has a size substantially equal to the size of the air space. The gas separator is preferably connectable to the tank, fluid being transferable between the gas separator and the tank. The vacuum source has an inlet, and the vacuum source inlet may be connectable to the gas separator.

In some constructions, the vacuum source includes a pump having a pump inlet conduit connectable to the gas separator, and a pump outlet, and a venturi supported on the vehicle, the venturi having a first inlet connectable to the pump outlet, a second inlet connectable to the battery cell, and a venturi outlet connectable to the gas separator, the pump being operable to cause flow through the venturi, flow through the venturi causing fluid flow through the battery cell and from the venturi outlet to the gas separator. The vacuum source may include a muzzle connectable between the venturi outlet and the tank, fluid being collectable in the muzzle to submerge the venturi outlet.

Further, the present invention provides a vacuum source for supplying fluid from a tank to a battery, the battery including a battery cell, fluid being transmittable to the battery cell. The vacuum source is defined as comprising a pump connectable to the tank, a venturi including a nozzle connectable to the pump, the nozzle discharging fluid received from the pump, a suction inlet connectable to the battery cell, and a discharge outlet, and a muzzle connectable to the discharge outlet, fluid being collectable in the muzzle to submerge the discharge outlet, the pump being operable to cause fluid flow through the venturi, fluid flow through the venturi causing suction at the suction inlet, the suction causing fluid flow through the battery cell and from the battery cell through the suction inlet.

Also, the present invention provides a vacuum source for supplying fluid from a tank to a battery in a vehicle, the vehicle including a frame supporting the battery, the battery including a battery cell, fluid being transmittable to the battery cell. The vacuum source is defined as comprising a pump connectable to the tank, and a venturi supported on the frame. The venturi is defined as including a nozzle connectable to the pump, the nozzle discharging fluid received from the pump, a suction inlet connectable to the battery cell, and a discharge outlet, the pump being operable to cause fluid flow through the venturi, fluid flow through the venturi causing suction at the suction inlet, the suction causing fluid flow through the battery cell and from the battery cell through the suction inlet.

In addition, the present invention provides a vehicle comprising a frame supported for movement over ground, a motor supported by the frame and operable to selectively drive the vehicle, a battery supported by the frame and electrically connectable with the motor, the battery including a battery cell, fluid being transmittable to the battery cell, and a hydraulic circuit connecting the battery to a tank for holding fluid. The hydraulic circuit is defined as including an inlet conduit connectable to the tank, an outlet conduit connectable to the battery cell, and a vacuum source supported on the frame. The vacuum source is defined as including a pump having a pump inlet connectable to the tank and a pump outlet, and a venturi having a first inlet connectable to the pump outlet, a second inlet connectable to the battery cell, and a venturi outlet, the pump being operable to cause flow through the venturi, flow through the venturi causing fluid flow from the tank and through the battery cell.

In some constructions, the vehicle may be a golf cart. Also, the tank may be supported on the frame. The tank may have a first outlet for supplying fluid to the vacuum source, an inlet for receiving fluid from the vacuum source, and a second outlet for supplying fluid to the battery cell.

In some constructions, the vehicle may further comprise a gas separator connectable to the battery cell, gas and fluid from the battery cell flowing into the gas separator, the gas being separated from the fluid in the gas separator. In some constructions, the vacuum source may include a muzzle connectable to the venturi outlet, fluid being collectable in the muzzle to submerge the venturi outlet.

The vehicle may further comprise a second battery supported by the frame and electrically connectable with the motor, the second battery including a second battery cell, fluid being transmittable to the second battery cell. The pump may be operable to cause flow through the venturi, flow through the venturi causing fluid flow from the tank and through the first battery cell and through the second battery cell.

The vehicle may further comprise a controller connectable to the pump for controlling fluid replenishment to the battery. The controller may activate the pump when the fluid level is low in the battery cell to cause fluid flow from the tank to the battery cell. Preferably, the battery is connectable with the motor to selectively power the motor.

Further, the present invention provides a combination comprising a vehicle and a system for supplying fluid to the battery. The system is defined as including a hydraulic circuit connecting the battery to a tank for holding fluid, the hydraulic circuit including an inlet conduit connectable to the tank, an outlet conduit connectable to the battery cell, and a vacuum source. The vacuum source is defined as including a pump having a pump inlet connectable to the tank and a pump outlet, a venturi having a first inlet connectable to the pump outlet, a second inlet connectable to the battery cell, and a venturi outlet, and a muzzle connectable to the venturi outlet, fluid being collectable in the muzzle to submerge the venturi outlet, the pump being operable to cause flow through the venturi, flow through the venturi causing fluid flow from the tank, through the battery cell, and from the venturi outlet.

In some constructions, the vacuum source may be supported on the frame. Also, the hydraulic circuit may be supported on the frame. In addition, the tank may be supported on the frame. In some constructions, the combination may further comprise a gas separator connectable to the battery cell, gas and fluid from the battery cell flowing into the gas separator, the gas being separated from the fluid in the gas separator.

Also, the present invention provides a combination comprising a vehicle and a system for supplying fluid to the battery. The system is defined as including a hydraulic circuit connecting the battery to a tank for holding fluid, the hydraulic circuit including an inlet conduit connectable to the tank, an outlet conduit connectable to the battery cell, a vacuum source connectable to the battery cell and to the tank, the vacuum source being operable to cause fluid flow from the tank and through the battery cell, and a gas separator connectable to the battery cell, fluid and gas from the battery cell flowing into the gas separator, the gas being separated from the fluid in the gas separator.

In addition, the present invention provides a combination for supplying fluid to a battery, the battery including a battery cell, fluid being transmittable to the battery cell. The combination is defined as comprising a vacuum source connectable to the battery cell and to a tank for holding fluid, the vacuum source being operable to cause fluid flow from the tank and through the battery cell, and a gas separator connectable to the battery cell, fluid and gas from the battery cell flowing into the gas separator, the gas being separated from the fluid in the gas separator.

Further, the present invention provides a method for supplying fluid to a battery, the battery including a battery cell, fluid being transmittable to the battery cell. The method is defined as comprising the acts of providing a system for supplying fluid to the battery, the system including a hydraulic circuit connecting the battery to a tank for holding fluid, the hydraulic circuit including an inlet conduit connectable to the tank, an outlet conduit connectable to the battery cell, and a vacuum source connectable between the battery cell and the tank, the vacuum source including a pump including a pump inlet connectable to the tank and a pump outlet, a venturi including a first inlet connectable to the pump outlet, a second inlet connectable to the battery cell, and a venturi outlet, a muzzle connectable to the venturi outlet, collecting fluid in the muzzle to submerge the venturi outlet, and operating the pump to cause fluid flow through the venturi, flow through the venturi causing fluid flow from the tank and through the battery cell.

The providing act may include providing a gas separator connectable to the battery cell, wherein the operating act includes causing fluid and gas to flow from the battery cell to the gas separator, and the method may further comprise the act of separating the gas from the fluid in the gas separator.

Also, the present invention provides a method for charging a battery, the battery including a battery cell, fluid being transmittable to the battery cell. The method is defined as comprising the acts of providing a system for supplying fluid to the battery, the system including a hydraulic circuit connecting the battery to a tank for holding fluid, the hydraulic circuit including an inlet conduit connectable to the tank, an outlet conduit connectable to the battery cell, and a vacuum source connectable between the battery cell and the tank, the vacuum source including a pump including a pump inlet connectable to the tank and a pump outlet, a venturi including a first inlet connectable to the pump outlet, a second inlet connectable to the battery cell, and a venturi outlet, a muzzle connectable to the venturi outlet, collecting fluid in the muzzle to submerge the venturi outlet, charging the battery, operating the pump to cause fluid flow through the venturi, flow through the venturi causing fluid flow from the tank and through the battery cell, ceasing operation of the pump to stop fluid flow through the battery cell, continuing to charge the battery, and ceasing charging of the battery.

The providing act may include providing a gas separator connectable to the battery cell, wherein the operating act includes causing fluid and gas to flow from the battery cell to the gas separator, and the method may further comprise the act of separating the gas from the fluid in the gas separator.

One independent advantage of the present invention is that, is some aspects and in some constructions, the fluid source is supported on the vehicle. Therefore, a separate fluid hook-up step is not required before the liquid electrolyte can be replenished in the batteries.

Another independent advantage of the present invention is that, in some aspects and in some constructions, the fluid supply system automatically replenishes the necessary fluid to the batteries when necessary and each time the batteries are to be replenished. The operator is only required to add fluid to the system when no fluid remains in the fluid source after replenishment.

Yet another independent advantage of the present invention is that, in some aspects and in some constructions, the pressure source is supported on the vehicle. Therefore, a separate source of pressure is not required.

A further independent advantage of the present invention is that, in some aspects and in some constructions, the battery gas drawn from the batteries is not returned to the source of fluid or tank. The battery gas is separated in and vented from a gas diverter or gas separator.

Another independent advantage of the present invention is that, in some aspects and in some constructions, even if the venturi is above the fluid level in a fluid system, with the muzzle, the venturi will produce the necessary suction to cause fluid flow in the system.

Other independent features and independent advantages of the present invention are apparent to those skilled in the art upon review of the following detailed description, claims and drawings.

BRIEF DESCRIPTION OF THE DRAWINGS

FIG. 7 is a perspective view of a second construction of the fluid supply system.

Before one embodiment of the invention is explained in detail it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 1:
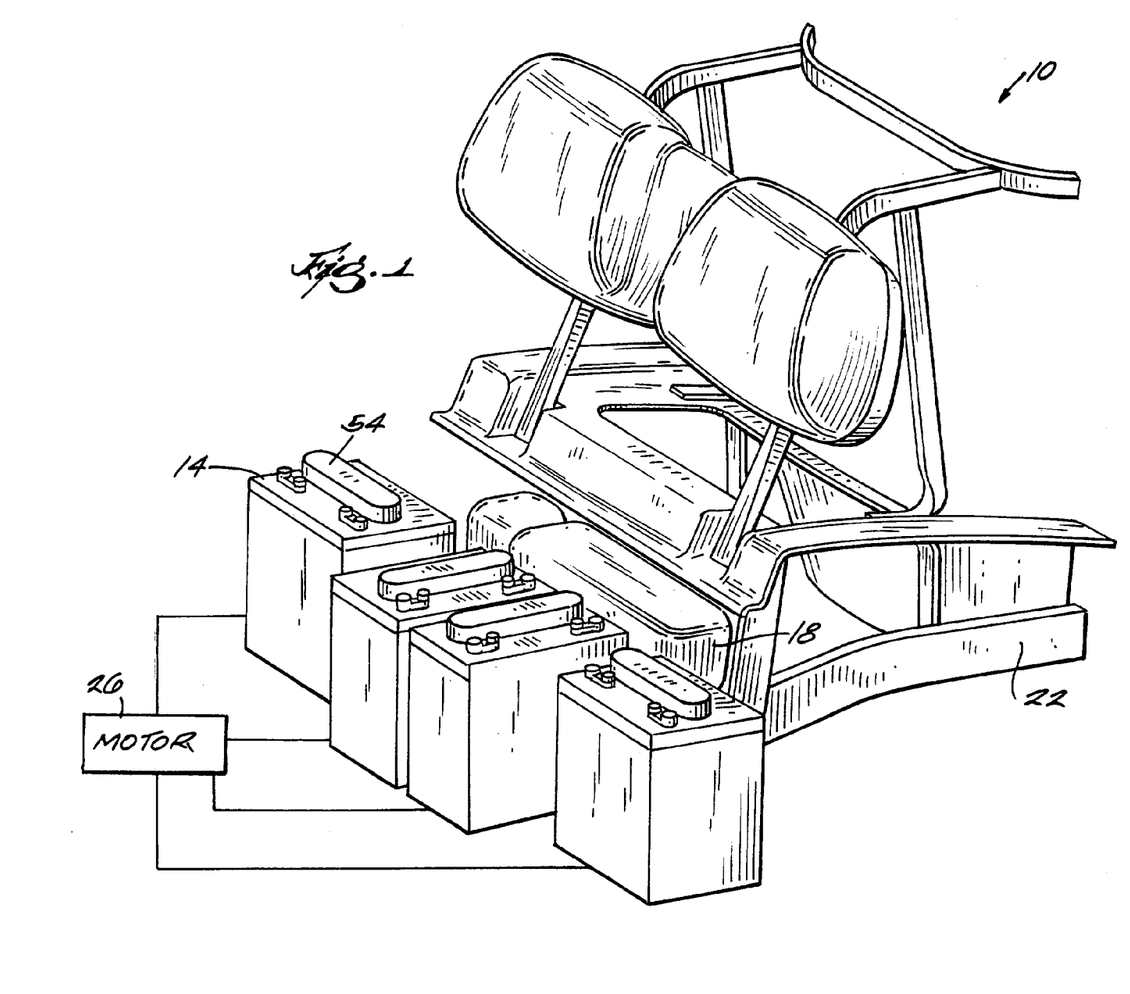
FIG. 1 is a perspective view of a portion of a vehicle, including a fluid supply system embodying the present invention.

A portion of a vehicle 10, such as, for example, an electric car, a golf car or a utility vehicle, including at least one electrolyte battery 14 and a fluid supply system 18 for supplying fluid to the battery 14, is illustrated in FIG. 1. The vehicle 10 includes a frame 22 supported by wheels for movement over ground. The vehicle 10 also includes a motor 26 (schematically shown) supported on the frame 22 and operable to power the vehicle 10. In the illustrated construction, the motor 26 is electrically connectable with a plurality of batteries 14 (four shown) to selectively power the vehicle 10. A steering assembly (not shown) is provided to control movement of the vehicle 10.

The fluid supply system 18 includes a source of fluid, such as a tank 30 for holding fluid. In the illustrated construction, the tank 30 is supported on the frame 22. The tank 30 includes (see FIGS. 1–2) a container 34 into which fluid is poured through a removable cap 38 and from which fluid is supplied to the batteries 14. The tank 30 may also include a strainer element (not shown) for removing debris from the fluid supply and preventing the debris from entering the tank 30.

In some aspects and in the illustrated construction, the system 18 also includes (see FIG. 2) a gas separator or gas diverter 40, which includes a vent 42 for venting battery gas generated during operation and charging of the batteries 14. In the illustrated construction, the vent 42 includes a flame arrestor 46 to prevent any flame from passing into the container 34, should the vented gases ignite. In the illustrated construction, the gas diverter 40 is supported on the frame 22.

Figure 2:
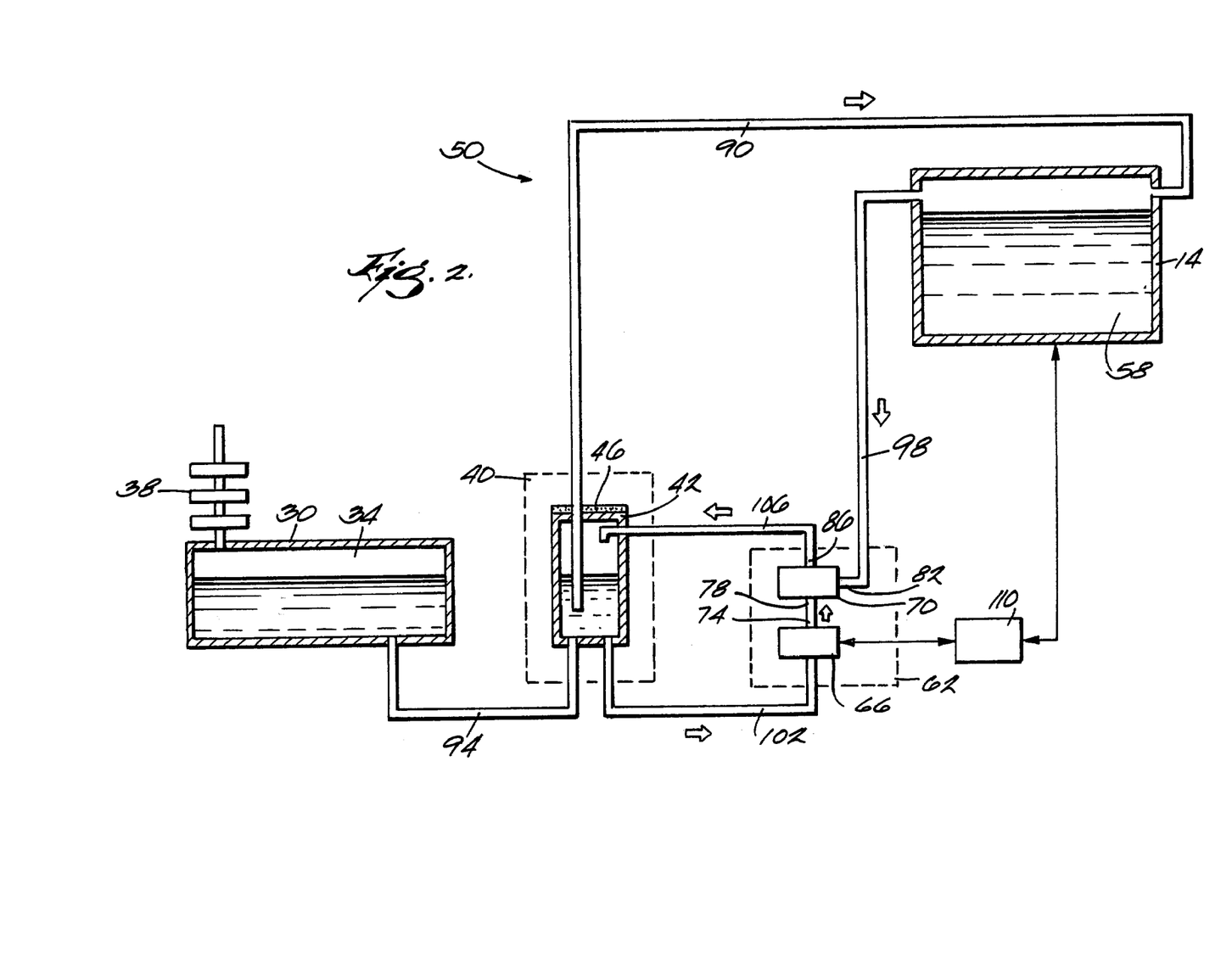
FIG. 2 is a schematic of a first construction of the fluid supply system.

In the illustrated construction, the gas diverter 40 has a volume about the size of the air space of a battery cell 58. It should be understood that, in other constructions (not shown), the gas diverter 40 may be larger or smaller than the size of the air space of the battery cell(s) 58.

The fluid supply system 18 also includes a hydraulic circuit 50 connecting the battery 14 to the tank 30. The hydraulic circuit 50 includes a fluid supply member (not shown) provided by, in the illustrated construction, a filling pod 54 and connectable to a battery cell 58. Fluid is supplied to the cell 58 through the fluid supply member, and gases are vented from the battery cell 58 through the fluid supply member. The filling pod 54 (shown in FIG. 1) may include a number of fluid supply members, each associated with and supplying fluid to a battery cell 58.

The hydraulic circuit 50 also includes a vacuum source 62. In some aspects and in the illustrated construction, the vacuum source 62 is supported on the frame 22. The vacuum source 62 includes a pump 66 and a jet pump eductor or venturi 70. The vacuum source 62 also includes a conduit 74 connectable between the outlet of the pump 66 and the venturi 70. The venturi 70 defines a motive fluid inlet or first inlet 78, a suction fluid inlet or second inlet 82, and a discharge fluid outlet or venturi outlet 86.

In the construction shown in FIG. 2, the hydraulic circuit 50 also includes a conduit 90 connectable between the gas diverter 40 and the battery cell 58. The gas diverter 40 acts as a fluid supply tank for the fluid supply system 18. The gas diverter 40 receives fluid from the tank 30 by a conduit 94, which acts as a water trap between the tank 30 and the gas diverter 40. The conduit 94 remains filled with fluid even when the tank 30 and gas diverter 40 are empty, so that only fluid will pass between the tank 30 and the gas diverter 40. Gas is vented only through the vent 42 and is not passed to the tank 30, because of the water trap provided by the conduit 94, preventing the battery gas from being vented when the operator removes the fill cap 38.

It should be understood that, in some aspects and in other constructions (not shown), the gas diverter 40 may be used with another vacuum source (not shown) to separate and divert any battery gas drawn from the battery cells 58 by such a vacuum source. It should also be understood that, in some aspects and in other constructions (not shown), the gas diverter 40 may be supported off the vehicle 10 such as at a replenishment station or on a replenishment cart to separate and divert any battery gas from the battery cells 58 caused by the vacuum source or pressure source at such a station or on such a cart.

The hydraulic circuit 50 includes a conduit 98 connectable between the battery cell 58 and the vacuum source 62. A conduit 102 is connectable between the gas diverter 40 and the vacuum source 62, and a conduit 106 is connectable between the vacuum source 62 and the gas diverter 40.

The vehicle 10 also includes an on-board computer 110 (illustrated in FIG. 2). The on-board computer 110 is similar to the controller described in U.S. Pat. No. 6,087,805, issued Jul. 11, 2000, which is hereby incorporated by reference. Generally, the on-board computer 110 records the amount of energy in the battery 14 and determines when to allow the battery 14 to be charged. When the energy in the battery 14 falls below a predetermined level, the on-board computer 110 will allow the battery 14 to be charged.

The on-board computer 110 also controls the replenishment of battery fluid. The on-board computer 110 controls operation of the pump 66. The on-board computer 110 monitors the energy (in ampere-hours) removed from the battery 14 and uses the record of removed energy to determine the timing of battery charging. The on-board computer 110 also determines the total duration of a charging cycle by measuring the rate of change of the charging current. The on-board computer 110 determines the amount of charge on the battery 14 by measuring the energy added to the battery 14 during charging.

In addition, by keeping a history of the removal and supply of energy to the battery 14 during operation and charging, respectively, the on-board computer 110 determines when the pump 66 should be activated so that fluid is supplied to the battery 14. The on-board computer 110 estimates the fluid level in the battery 14 and activates the pump 66, when necessary, to supply fluid to the battery 14.

It should be understood that, in other constructions (not shown), the fluid supply system 18 may include a sensor (not shown) for sensing the fluid level in the battery 14. Such a sensor would provide a signal to the on-board computer 110 to indicate the fluid level in the battery 14 and/or that fluid replenishment is necessary, and the on-board computer 110 would then activate the pump 66 to supply fluid to the battery 14.

Figure 3:
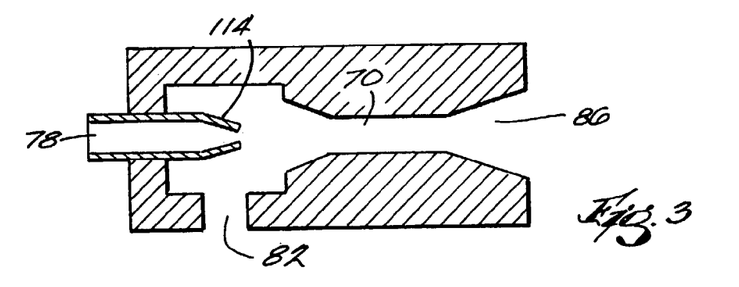
FIG. 3 is a side cross-sectional view of a portion of the fluid supply system.
Figure 4:
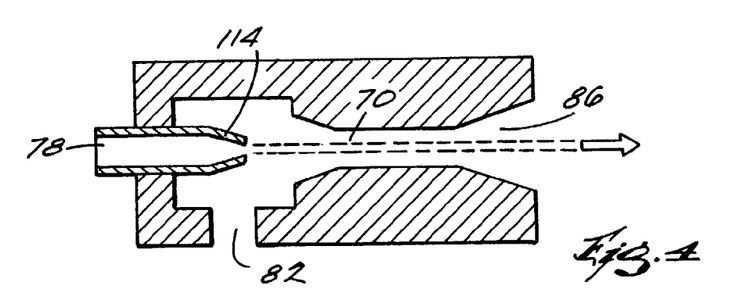
FIG. 4 is a side cross-sectional view of the portion of the fluid supply system.
Figure 5:
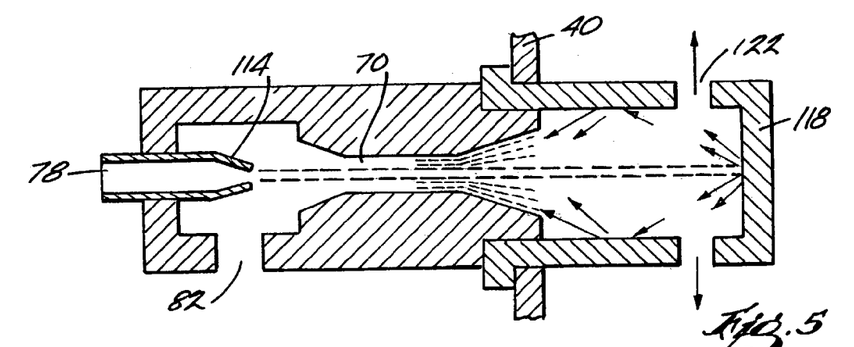
FIG. 5 is a side cross-sectional view of the portion of the fluid supply system and illustrating a muzzle.

The venturi 70 is shown in more detail in FIGS. 3–5. In some aspects and in the illustrated construction, the venturi 70 is supported on the frame 22. The venturi 70 includes a nozzle 114 which directs a high velocity fluid stream through the venturi 70. The size and shape of the nozzle 114 can be modified to effect changes in the fluid flow and suction parameters. The venturi 70 also includes a first inlet 78, a second inlet 82, and a venturi outlet 86. Fluid flow through the venturi 70 is illustrated in FIG. 4.

Figure 6:
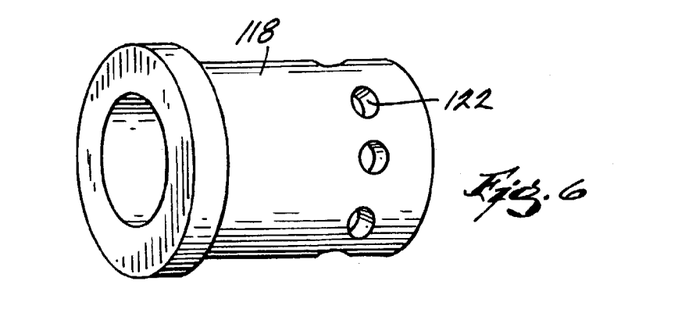
FIG. 6 is a perspective view of the muzzle.

As shown in FIGS. 5–6, a muzzle 118 is connectable between the venturi outlet 86 and the gas diverter 40. The muzzle 118 captures the high velocity fluid stream and collects enough fluid at the venturi outlet 86 to direct the fluid against the walls of the venturi 70 and to submerge the venturi outlet 86. A small amount of back pressure is generated at the venturi outlet 86, which allows suction at the second inlet 82. The suction at the second inlet 82 causes fluid flow from the battery cell 58 through the conduit 98. Filling of the muzzle 118 also converts the high velocity, low volume flow of the nozzle 114 to a low velocity, high volume flow to return the fluid to the gas diverter 40. The muzzle 118 (see FIGS. 5–6) includes openings 122 to allow the fluid to pass through to the gas diverter 40. The total cross-sectional area of the openings 122 in the muzzle 118 is greater than the cross-sectional area of the venturi outlet 86, such that fluid flow is slightly restricted after the high velocity stream is slowed down by the venturi 70.

The muzzle 118 allows the venturi 70 to function as described above even though the venturi outlet 86 may be above the fluid level in the gas diverter 40. If, in the system 18, the venturi outlet 86 is below the fluid level, the fluid surrounding the venturi outlet 86 would create the back pressure, and the muzzle 118 may not be necessary.

It should be understood that, in some aspects and in other constructions (not shown), the muzzle 118 may be supported off the vehicle 10 and used with a venturi 70 which is supported off the vehicle 10 (i.e., in a replenishment station or on a replenishment cart). In such constructions, the muzzle 118 ensures proper operation of the venturi 70 even if the venturi 70 is positioned above the fluid level in such a system (not shown).

In the construction shown in FIG. 2, fluid is initially supplied to the tank 30. During fluid replenishment, the pump 66 is operated by the on-board computer 110, which causes fluid flow from the gas diverter 40 through the conduit 102. The fluid flows through the pump outlet 74 and through the first inlet 78. Fluid flows through the nozzle 114 and through the venturi 70 and collects at the muzzle 118. As fluid collects at the muzzle 118, back pressure develops in the venturi 70, and a vacuum is generated at the second inlet 82, which causes fluid flow from the battery cell 58 through the conduit 98 and through the second inlet 82. Filling of the muzzle 118 also converts the high velocity, low volume flow of the nozzle 114 to a low velocity, high volume flow to return the fluid to the gas diverter 40. As the characteristics of the fluid flow in the venturi 70 change, a vacuum is generated at the second inlet 82, which causes fluid flow from the battery cell 58 through the conduit 98 and through the second inlet 82. The vacuum also causes fluid flow from the gas diverter 40 through the conduit 90 to the battery cell 58 to replenish the battery cell 58 in a closed loop.

Preferably, replenishment of fluid to the battery cell(s) 58, if necessary, is accomplished during charging of the battery 14 under the control of the on-board computer 110. During the initial portion of the charging cycle, fluid is supplied to the battery cells 58, and the battery 14 is charged. Any fluid and gas flowing from the battery cells 58 flows to the gas diverter 40 and is vented from the system 18. During this initial portion of the charging cycle, little gas is typically produced by the battery cells 58.

As the charging cycle continues (for example, at about three-quarters of the cycle), more gas begins to be produced by the battery cells 58. During this portion of the charging cycle, fluid is not supplied to the battery cells 58. The vacuum source 62 does not operate to draw battery gas from the battery cells 58. Any gas flowing from the battery cells 58 is separated in the gas diverter 40 and vented from the system 18.

It should be understood that, in some other operations, charging of the battery 14 and replenishment of the battery cells 58 may be conducted in another manner. For example, replenishment of fluid to the battery cells 58 may be provided separately from charging of the battery 14 (before or after charging). Also, replenishment may be conducted during another portion(s) of the charging cycle or during the whole charging cycle.

An alternative construction of a fluid supply system 18A is illustrated in FIG. 7. Common elements are identified by the same reference number "A".

The construction shown in FIG. 7 is similar to the construction illustrated in FIG. 2. However, as shown in FIG. 7, the tank 30A is connected to the pump 66A rather than to the gas diverter 40A. The gas diverter 40A acts as a fluid supply source to the battery cell (not shown, but similar to battery cell 58A), and the tank 30A acts as a fluid supply source to the pump 66A. The tank 30A is connected to the gas diverter 40A through the conduit 94A, the gas diverter 40A is connected to the battery cell, and the battery cell is connected to the second inlet 82A of the venturi 70A.

In the construction shown in FIG. 7, fluid is initially supplied to the tank 30A. During fluid replenishment, the pump 66A is operable to cause fluid flow from the tank 30A through the pump 66A. The fluid flows through the pump outlet 74A and through the first inlet 78A. Fluid flows through the venturi 70A and collects downstream of the venturi 70A. As the fluid collects downstream of the venturi 70A, the fluid is converted from the high velocity, low volume flow to a low velocity, high volume flow to return the fluid to the gas diverter 40A. As the characteristics of the fluid flow in the venturi 70 change, a vacuum is generated at the second inlet 82A, which causes fluid flow from the battery cell 58A through the second inlet 82A. The vacuum also causes fluid flow from the gas diverter 40A to the battery cell 58A to replenish the battery cell 58A in a closed loop.

It should be understood that the constructions of the fluid supply system 18 shown in FIGS. 2 and 7 may be used in a single or multi-battery systems. It should also be understood that, in the multi-battery system, the fluid supply system 18 may include more than one battery 14 connected in series, parallel, or series/parallel combination.

One or more of the above-identified or other independent features and independent advantages of the invention are set forth in the following claims:

What is claimed is:

1. A system for supplying fluid to a battery, the battery including a battery cell, fluid being transmittable to the battery cell, the system comprising:
    a hydraulic circuit connecting the battery to a tank for holding fluid, the hydraulic circuit including
        an inlet conduit connectable to the tank, and
        an outlet conduit connectable to the battery cell; and
    a vacuum source connectable to the battery cell and to the tank, the vacuum source including
        a pump having a pump inlet connectable to the tank and a pump outlet,
        a venturi having a first inlet connectable to the pump outlet, a second inlet connectable to the battery cell, and a venturi outlet, and
        a muzzle connectable to the venturi outlet, fluid being collectable in the muzzle to submerge the venturi outlet, the pump being operable to cause flow through the venturi, flow through the venturi causing fluid flow from the tank, through the battery cell, and from the venturi outlet.

2. The system as set forth in claim 1, further comprising a gas separator connectable to the battery cell, fluid and gas from the battery cell flowing into the gas separator, the gas being separated from the fluid in the gas separator.

3. The system as set forth in claim 1, wherein the muzzle collects an amount of fluid sufficient to create a vacuum at the second inlet.

4. The system as set forth in claim 1, wherein the muzzle includes at least one opening allowing fluid flow from the venturi outlet.

5. The system as set forth in claim 4, wherein the venturi outlet has a cross-sectional outlet area, and wherein the at least one opening has a cross-sectional opening area, the opening area being greater than the outlet area.

6. The system as set forth in claim 1, wherein the muzzle provides a seal at the connection to the venturi outlet.

7. The system as set forth in claim 1, wherein the muzzle is connectable between the venturi outlet and the tank, and wherein fluid flows from the venturi outlet to the tank.

8. A system for supplying fluid to a battery in a vehicle, the vehicle including a frame supporting the battery, the battery including a battery cell, fluid being transmittable to the battery cell, the system comprising:
    a hydraulic circuit connecting the battery to a tank for holding fluid, the hydraulic circuit including
        an inlet conduit connectable to the tank, and
        an outlet conduit connectable to the battery cell; and
    a vacuum source connectable between the battery cell and the tank, the vacuum source including
        a pump having a pump inlet connectable to the tank and a pump outlet, and a venturi supported on the vehicle, the venturi having a first inlet connectable to the pump outlet, a second inlet connectable to the battery cell, and a venturi outlet, the pump being operable to cause flow through the venturi, flow through the venturi causing fluid flow from the tank, through the battery cell, and from the venturi outlet.

9. The system as set forth in claim 8, further comprising a gas separator connectable to the battery cell, fluid and gas from the battery cell flowing into the gas separator, the gas being separated from the fluid in the gas separator.

10. The system as set forth in claim 8, wherein the vacuum source includes a muzzle connectable between the venturi outlet and the tank, fluid being collectable in the muzzle to submerge the venturi outlet.

11. The system as set forth in claim 8, wherein the venturi outlet is connectable to the tank, and wherein fluid flows from the venturi outlet to the tank.

12. A system for supplying fluid to a battery, the battery including a battery cell, fluid being transmittable to the battery cell, the system comprising:
a hydraulic circuit connecting the battery to a tank for holding fluid, the hydraulic circuit including
an inlet conduit connectable to the tank,
an outlet conduit connectable to the battery cell;
a vacuum source connectable to the battery cell and to the tank, the vacuum source being operable to cause fluid flow from the tank and through the battery cell; and
a gas separator connectable to the battery cell, fluid and gas from the battery cell flowing into the gas separator, the gas being separated from the fluid in the gas separator.

13. The system as set forth in claim 12, wherein the gas separator includes a vent, the separated gas being vented through the vent.

14. The system as set forth in claim 12, wherein the battery cell has an air space having a size, and wherein the gas separator has a size substantially equal to the size of the air space.

15. The system as set forth in claim 12, wherein the gas separator is connectable to the tank, fluid being transferable between the gas separator and the tank.

16. The system as set forth in claim 12, wherein the vacuum source has an inlet, and wherein the vacuum source inlet is connectable to the gas separator.

17. The system as set forth in claim 12, wherein the vacuum source includes
a pump having a pump inlet conduit connectable to the gas separator, and a pump outlet, and
a venturi supported on the vehicle, the venturi having a first inlet connectable to the pump outlet, a second inlet connectable to the battery cell, and a venturi outlet connectable to the gas separator, the pump being operable to cause flow through the venturi, flow through the venturi causing fluid, flow through the battery cell and from the venturi outlet to the gas separator.

18. The system as set forth in claim 17, wherein the vacuum source includes a muzzle connectable between the venturi outlet and the tank, fluid being collectable in the muzzle to submerge the venturi outlet.

19. A vacuum source for supplying fluid from a tank to a battery, the battery including a battery cell, fluid being transmittable to the battery cell, the vacuum source comprising:
a pump connectable to the tank;
a venturi including a nozzle connectable to the pump, the nozzle discharging fluid received from the pump,
a suction inlet connectable to the battery cell, and
a discharge outlet; and
a muzzle connectable to the discharge outlet, fluid being collectable in the muzzle to submerge the discharge outlet, the pump being operable to cause fluid flow through the venturi, fluid flow through the venturi causing suction at the suction inlet, the suction causing fluid flow through the battery cell and from the battery cell through the suction inlet.

20. The vacuum source as set forth in claim 19, wherein the muzzle collects an amount of fluid sufficient to cause suction at the suction inlet, the suction causing flow from the battery cell through the suction inlet.

21. The vacuum source as set forth in claim 19, wherein the muzzle includes at least one opening allowing fluid flow from the discharge outlet to the tank.

22. The vacuum source as set forth in claim 21, wherein the discharge outlet has a cross-sectional outlet area, and wherein the at least one opening has a cross-sectional opening area, the opening area being greater than the outlet area.

23. The vacuum source as set forth in claim 19, wherein the muzzle provides a seal at the connection to the discharge outlet.

24. A vacuum source for supplying fluid from a tank to a battery in a vehicle, the vehicle including a frame supporting the battery, the battery including a battery cell, fluid being transmittable to the battery cell, the vacuum source comprising:
a pump connectable to the tank; and
a venturi supported on the frame, the venturi including
a nozzle connectable to the pump, the nozzle discharging fluid received from the pump,
a suction inlet connectable to the battery cell, and
a discharge outlet, the pump being operable to cause fluid flow through the venturi, fluid flow through the venturi causing suction at the suction inlet, the suction causing fluid flow through the battery cell and from the battery cell through the suction inlet.

25. The vacuum source as set forth in claim 24, further comprising a muzzle connectable to the discharge outlet, fluid being collectable in the muzzle to submerge the discharge outlet.

26. A vehicle comprising:
a frame supported for movement over ground;
a motor supported by the frame and operable to selectively drive the vehicle;
a battery supported by the frame and electrically connectable with the motor, the battery including a battery cell, fluid being transmittable to the battery cell;
a hydraulic circuit connecting the battery to a tank for holding fluid, the hydraulic circuit including
an inlet conduit connectable to the tank, and
an outlet conduit connectable to the battery cell, and
a vacuum source supported on the frame, the vacuum source including
a pump having a pump inlet connectable to the tank and a pump outlet, and
a venturi having a first inlet connectable to the pump outlet, a second inlet connectable to the battery cell, and a venturi outlet, the pump being operable to cause flow through the venturi, flow through the venturi causing fluid flow from the tank and through the battery cell.

27. The vehicle as set forth in claim 26, wherein the vehicle is a golf cart.

28. The vehicle as set forth in claim 26, wherein the tank is supported on the frame.

29. The vehicle as set forth in claim 28, wherein the tank has a first outlet for supplying fluid to the vacuum source, an inlet for receiving fluid from the vacuum source, and a second outlet for supplying fluid to the battery cell.

30. The vehicle as set forth in claim 26, wherein the system further includes a gas separator connectable to the battery cell, gas and fluid from the battery cell flowing into the gas separator, the gas being separated from the fluid in the gas separator.

31. The vehicle as set forth in claim 26, wherein the vacuum source further includes a muzzle connectable to the venturi outlet, fluid being collectable in the muzzle to submerge the venturi outlet.

32. The vehicle as set forth in claim 26, further comprising a second battery supported by the frame and electrically connectable with the motor, the second battery including a second battery cell, fluid being transmittable to the second battery cell.

33. The vehicle as set forth in claim 32, wherein the pump is operable to cause flow through the venturi, flow through the venturi causing fluid flow from the tank and through the first battery cell and through the second battery cell.

34. The vehicle as set forth in claim 26, further comprising a controller connectable to the pump for controlling fluid replenishment to the battery.

35. The vehicle as set forth in claim 34, wherein the controller activates the pump when the fluid level is low in the battery cell to cause fluid flow from the tank to the battery cell.

36. The vehicle as set forth in claim 26, wherein the battery is connectable with the motor to selectively power the motor.

37. A combination comprising:
a vehicle including
a frame supported for movement over ground,
a motor supported by the frame and operable to selectively drive the vehicle,
a battery supported by the frame and electrically connectable with the motor, the battery including a battery cell, fluid being transmittable to the battery cell; and
a system for supplying fluid to the battery, the system including
a hydraulic circuit connecting the battery to a tank for holding fluid, the hydraulic circuit including
an inlet conduit connectable to the tank, and
an outlet conduit connectable to the battery cell, and
a vacuum source including
a pump having a pump inlet connectable to the tank and a pump outlet,
a venturi having a first inlet connectable to the pump outlet, a second inlet connectable to the battery cell, and a venturi outlet, and
a muzzle connectable to the venturi outlet, fluid being collectable in the muzzle to submerge the venturi outlet, the pump being operable to cause flow through the venturi, flow through the venturi causing fluid flow from the tank, through the battery cell, and from the venturi outlet.

38. The combination as set forth in claim 37, wherein the vehicle is a golf cart.

39. The combination as set forth in claim 37, wherein the vacuum source is supported on the frame.

40. The combination as set forth in claim 37, wherein the hydraulic circuit is supported on the frame.

41. The combination as set forth in claim 37, wherein the tank is supported on the frame.

42. The combination as set forth in claim 37, wherein the system further includes a gas separator connectable to the battery cell, gas and fluid from the battery cell flowing into the gas separator, the gas being separated from the fluid in the gas separator.

43. The combination as set forth in claim 37, wherein the muzzle collects an amount of fluid sufficient to create a vacuum at the second inlet.

44. The combination as set forth in claim 37, wherein the muzzle includes at least one opening, allowing fluid flow from the venturi outlet.

45. The combination as set forth in claim 44, wherein the venturi outlet has a cross-sectional outlet area, and wherein the at least one opening has a cross-sectional opening area, the opening area being greater than the outlet area.

46. The combination as set forth in claim 37, wherein the muzzle provides a seal at the connection to the venturi outlet.

47. A combination comprising:
a vehicle including
a frame supported for movement over ground,
a motor supported by the frame and operable to selectively drive the vehicle,
a battery supported by the frame and electrically connectable with the motor, the battery including a battery cell, fluid being transmittable to the battery cell; and
a system for supplying fluid to the battery, the system including
a hydrauliccircuit connecting the battery to a tank for holding fluid, the hydraulic circuit including
an inlet conduit connectable to the tank, and
an outlet conduit connectable to the battery cell,
a vacuum source connectable to the battery cell and to the tank, the vacuum source being operable to cause fluid flow from the tank and through the battery cell, and
a gas separator connectable to the battery cell, fluid and gas from the battery cell flowing into the gas separator, the gas being separated from the fluid in the gas separator.

48. The combination as set forth in claim 47, wherein the vehicle is a golf cart.

49. The combination as set forth in claim 47 wherein the vacuum source is supported on the frame.

50. The combination as set forth in claim 47, wherein the hydraulic circuit is supported on the frame.

51. The combination as set forth in claim 47 wherein the tank is supported on the frame.

52. The combination as set forth in claim 47, wherein the gas separator is supported on the frame.

53. The combination as set forth in claim 47, wherein the gas separator includes a vent, the separated gas being vented through the vent.

54. The combination as set forth in claim 47, wherein the battery cell has an air space having a size, and wherein the gas separator has a size substantially equal to the size of the air space.

55. The combination as set forth in claim 47, wherein the gas separator is connectable to the tank, fluid being transferable between the gas separator and the tank.

56. The combination as set forth in claim 47, wherein the vacuum source has an inlet, and wherein the vacuum source inlet is connectable to the gas separator.

57. The combination as set forth in claim 47, wherein the vacuum source includes
   a pump having a pump inlet conduit connectable to the gas separator, and a pump outlet, and
   a venturi supported on the vehicle, the venturi having a first inlet connectable to the pump outlet, a second inlet connectable to the battery cell, and a venturi outlet connectable to the gas separator, the pump being operable to cause flow through the venturi, flow through the venturi causing fluid flow through the battery cell and from the venturi outlet to the gas separator.

58. The combination as set forth in claim 57, wherein the vacuum source includes a muzzle connectable between the venturi outlet and the tank, fluid being collectable in the muzzle to submerge the venturi outlet.

59. A combination for supplying fluid to a battery, the battery including a battery cell, fluid being transmittable to the battery cell, the combination comprising:
   a vacuum source connectable to the battery cell and to a tank for holding fluid, the vacuum source being operable to cause fluid flow from the tank and through the battery cell; and
   a gas separator connectable to the battery cell, fluid and gas from the battery cell flowing into the gas separator, the gas being separated from the fluid in the gas separator.

60. The combination as set forth in claim 59, wherein the gas separator includes a vent, the separated gas being vented through the vent.

61. The combination as set forth in claim 59, wherein the battery cell has an air space having a size, and wherein the gas separator has a size substantially equal to the size of the air space.

62. The combination as set forth in claim 59, wherein the gas separator is connectable to the tank, fluid being transferable between the gas separator and the tank.

63. The combination as set forth in claim 59, wherein the vacuum source has an inlet, and wherein the vacuum source inlet is connectable to the gas separator.

64. The combination as set forth in claim 59, wherein the vacuum source includes
   a pump having a pump inlet conduit connectable to the gas separator, and a pump outlet, and
   a venturi supported on the vehicle, the venturi having a first inlet connectable to the pump outlet, a second inlet connectable to the battery cell, and a venturi outlet connectable to the gas separator, the pump being operable to cause flow through the venturi, flow through the venturi causing fluid flow through the battery cell and from the venturi outlet to the gas separator.

65. The combination as set forth in claim 64, wherein the vacuum source includes a muzzle connectable between the venturi outlet and the tank, fluid being collectable in the muzzle to submerge the venturi outlet.

66. A method for supplying fluid to a battery, the battery including a battery cell, fluid being transmittable to the battery cell, said method comprising the acts of:
   providing a system for supplying fluid to the battery, the system including a hydraulic circuit connecting the battery to a tank for holding fluid, the hydraulic circuit including an inlet conduit connectable to the tank, an outlet conduit connectable to the battery cell, and a vacuum source connectable between the battery cell and the tank, the vacuum source including a pump including a pump inlet connectable to the tank and a pump outlet, a venturi including a first inlet connectable to the pump outlet, a second inlet connectable to the battery cell, and a venturi outlet, a muzzle connectable to the venturi outlet;
   collecting fluid in the muzzle to submerge the venturi outlet; and
   operating the pump to cause fluid flow through the venturi, flow through the venturi causing fluid flow from the tank and through the battery cell.

67. The method as set forth in claim 66, wherein the providing act includes providing a gas separator connectable to the battery cell, wherein the operating act includes causing fluid and gas to flow from the battery cell to the gas separator, and wherein said method further comprises the act of separating the gas from the fluid in the gas separator.

* * * * *